June 23, 1953   C. S. SUNDBOM ET AL   2,643,145
BUILT-UP CRANKSHAFT FOR RECIPROCATING MACHINERY
Filed June 18, 1949   4 Sheets-Sheet 1
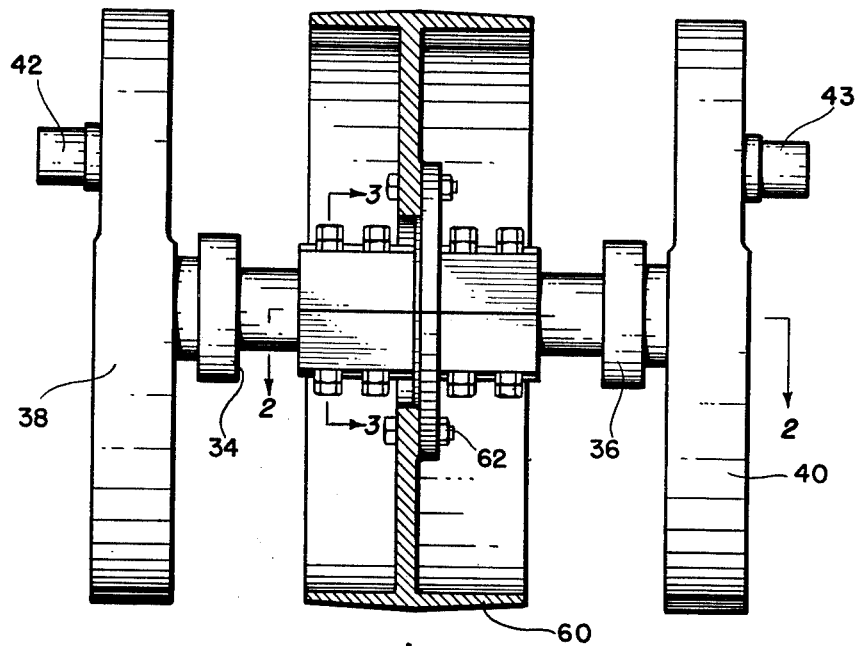
FIG.__1
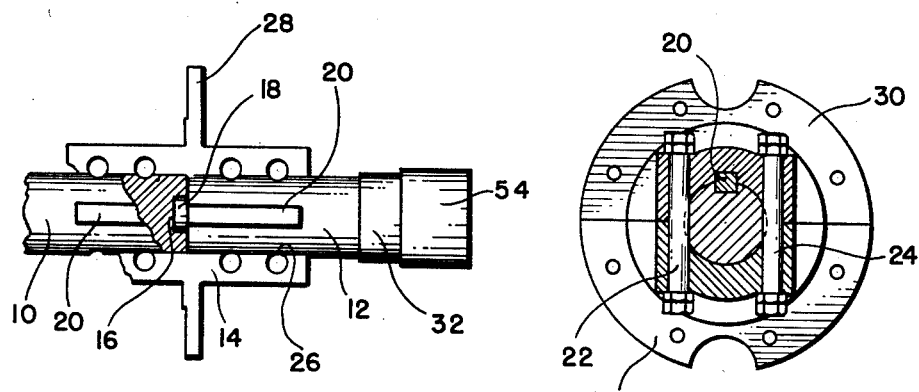
FIG.__2   FIG.__3
CARL V. WINQUIST &
CARL S. SUNDBOM
Inventor
By Smith + Tuck
Attorneys CARL V. WINQUIST &
CARL S. SUNDBOM
Inventor

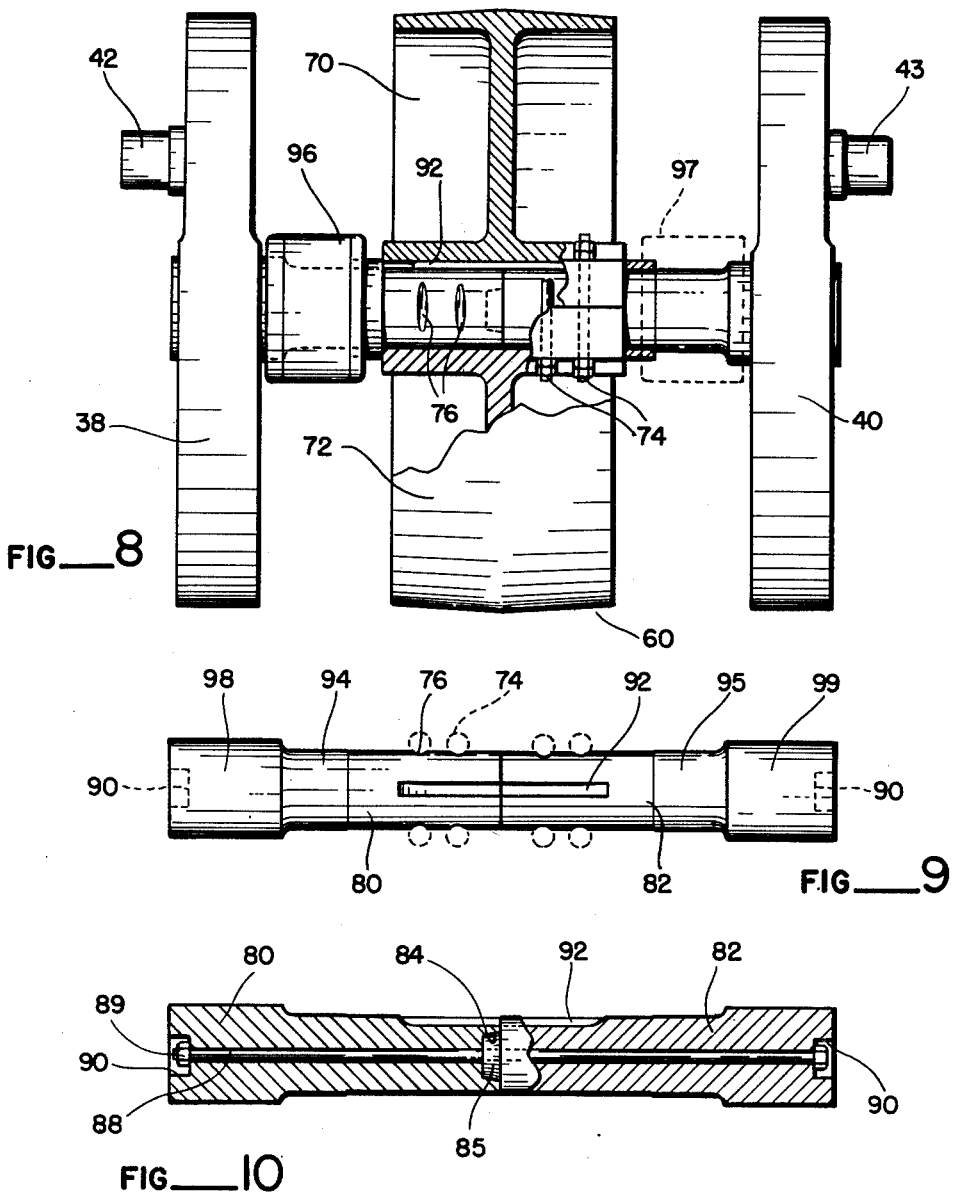

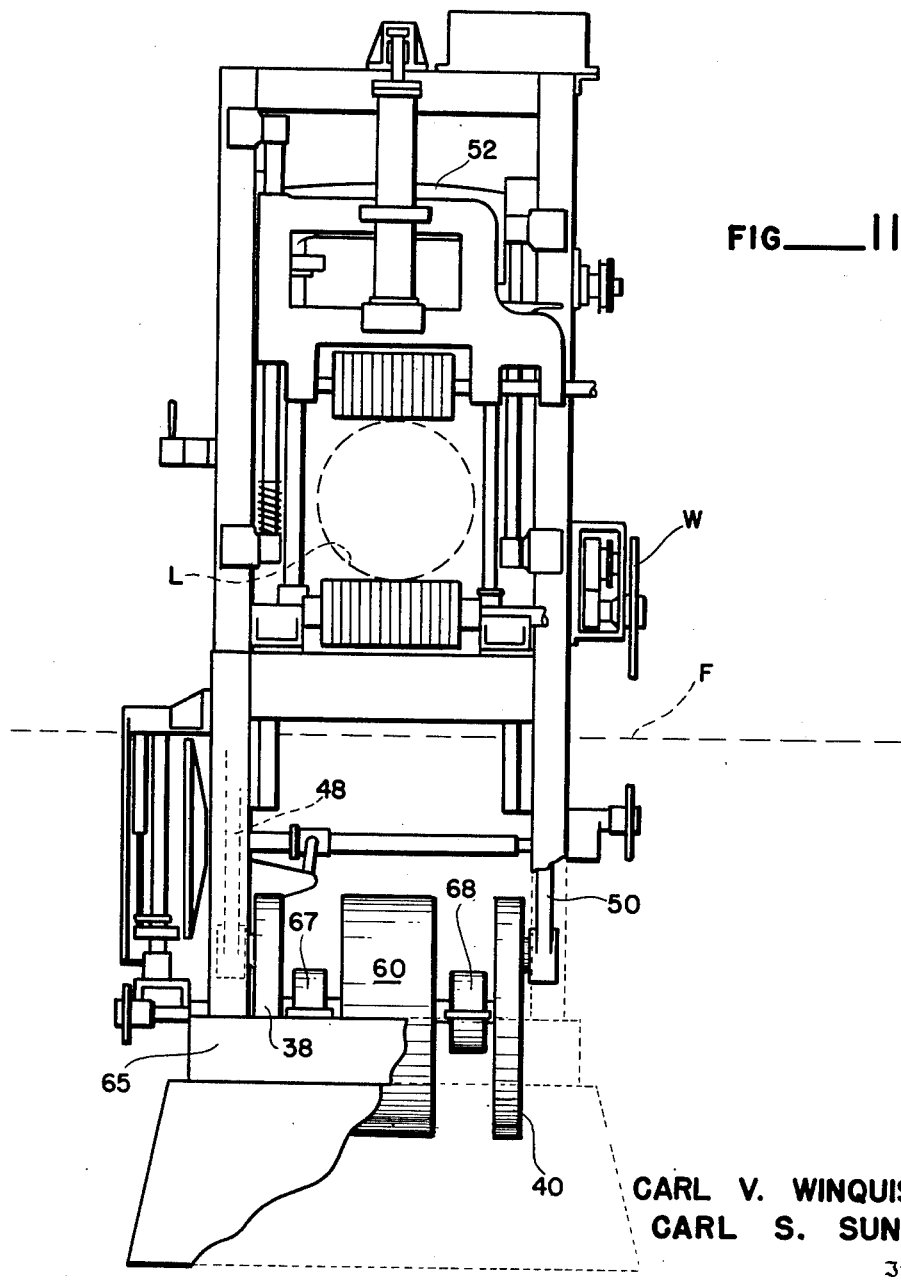

Patented June 23, 1953

2,643,145

UNITED STATES PATENT OFFICE 2,643,145

BUILT-UP CRANKSHAFT FOR RECIPROCATING MACHINERY

Carl Samuel Sundbom and Carl Victor Winquist, Seattle, Wash., assignors to Mill Engineering & Supply Co., Seattle, Wash.

Application June 18, 1949, Serial No. 100,042

2 Claims. (Cl. 287—111)

Our present invention relates to the general art of crank shafts for machinery and, more particularly, to a built-up crank shaft for reciprocating machinery.

In the general advancement of machine design there is an ever increasing urge for increased speed of operation, and this requires increased rotative speeds of crank shafts used in any such machine equipment. It is a well known engineering principle that as the speed of operation of reciprocating masses is increased the inertia element increases very rapidly, and this increase places tremendous momentary loadings on the bearings supporting the crank shaft, as the load is stopped and started at each end of its reciprocation. It, therefore, follows that where we combine heavy loading and high rotative speeds, it is very necessary that we employ bearings that are adequate for the load under these conditions, and we believe that we have made a practical solution of this problem, as it relates to certain types of machinery.

Our built-up crank shaft is intended for high loading at relatively high rotative speeds and finds a very appropriate application in the crank shaft of gang saws, although there may be other equipment where similar conditions are experienced and where our equipment should serve equally well. In a gang saw, provision is made for the mounting of a plurality of saws in a sliding frame, which is power driven in a reciprocating manner. As the saws and their supporting carriage, or sash, have considerable mass, the connecting rods which join the sash to the crank shaft must be quite heavy in order to deliver the loads without bending, and as a result the crank shaft must be adequately counter-balanced if high speed rotation is to be achieved.

We have, therefore, arranged our crank shaft so that it can revolvably support counter-balanced cranks of considerable mass, and also support the driving pulley through which the driving impulse of the prime mover is applied. We then provide anti-friction bearings of the roller or ball type on each side of the driving pulley and inside of the counter-balanced crank, so there will be no interference with the connecting rods. These anti-friction bearings must be so arranged that they can be easily replaced. Consequently, we have made our supporting shaft in two parts so that it can be divided in the center, and either of the shaft bearings may be replaced without undue expense or trouble.

The principal object of our invention, therefore, is to provide a built-up crank shaft employing anti-friction bearings which can be easily and cheaply replaced.

A further object of our invention is to provide a crank shaft having two or more axially aligned shaft members so arranged as to insure their rigidity, to maintain their coaxial placement, and to prevent their moving out of abutting relationship.

Further objects, advantages and capabilities will be apparent from the description and disclosure in the drawings, or may be comprehended or are inherent in the device.

In the drawings:

Figure 1 is a face view of a complete crank made up after the teachings of our invention, and shows the driving pulley for the same in section to better illustrate the details of structure;

Figure 2 is a fragmentary view taken along the plane of line 2—2 of Figure 1 with a small portion of one of the shafts shown in section;

Figure 3 is a cross-sectional view taken along the line 3—3 of Figure 1;

Figure 8 is an assembled view of a slightly modified form of our structure, with certain parts being shown in section;

Figure 9 is a top plan view of the shaft of Figure 8, with the bolts securing the drive pulley in place shown in dotted lines;

Figure 10 is a horizontal sectional view with the cutting plane revolved 90° from Figure 9, certain parts are shown in section;

Figure 11 is a front face view, in elevation, of a typical gang saw, as the same is representative of an important use of our built-up crank shaft.

Figure 4:
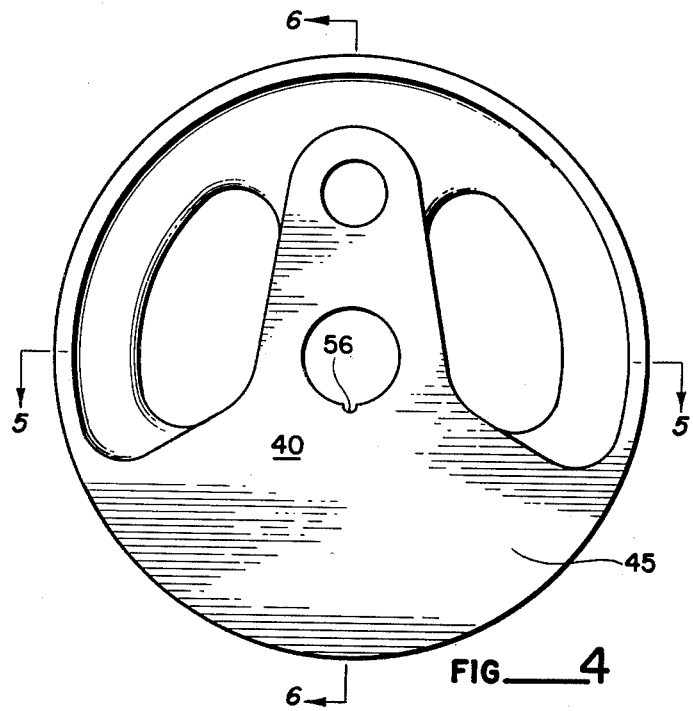
Figure 4 is a face view of a typical counter-balanced crank member, which is employed with our crank shaft.
Figure 6:
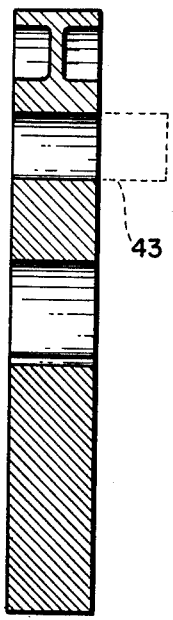
Figure 6 is a cross-sectional view taken along the line 6—6 of Figure 4 with a crank pin shown in dotted line position thereon.
Figure 5:
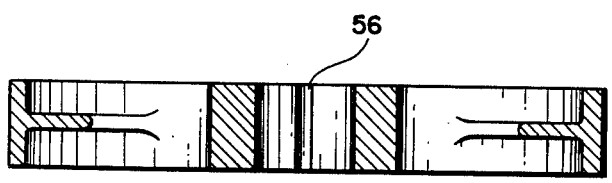
Figure 5 is a cross-sectional view taken along the line 5—5 of Figure 4.
Figure 7:
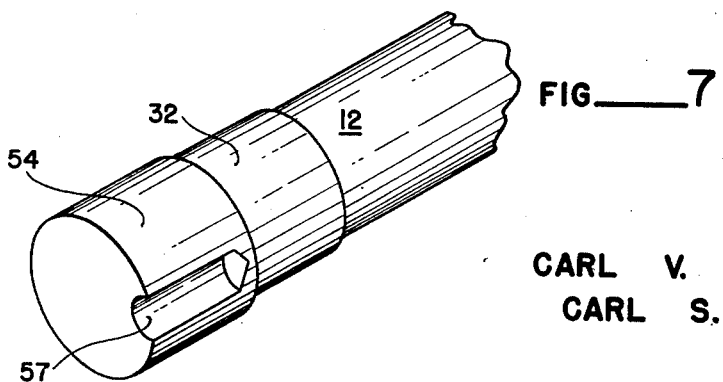
Figure 7 is a fragmentary, perspective view showing the crank end of one of our stub shafts.

Referring more particularly to the disclosure in the drawings, the numerals 10 and 12 designate two stub shafts as used in a two part, built-up crank shaft. These shafts are turned to provide the cylindrical portions for engagement with the coupling member 14. This coupling member we prefer to form in two halves, so that it can be disconnected and lifted out of place. It is bored to accurately accept the two abutting ends of shafts 10 and 12. Axial alignment of these shafts is further assured by providing a female recess or counter-bore 16, as in member 10, and a male extension, or detent 18 in stub shaft 12 adapted for snug seating in said recess. The two shafts are each provided with a keyway, which accepts keys, as 20. These keys fit into an appropriate keyway formed in one of the two half coupling members, as after the showing in Figure 3. To provide against longitudinal displacement from the desirable abutting relationship, we have provided that the plurality of securing bolts as 22 and 24, which secure the two halves of coupling member 14 together, have their center-to-center spacings so arranged that the bolts will seat in transverse grooves 26 cut in the abutting ends of shafts 10 and 12, after the showing in Figures 2 and 3. When a built-up shaft of this order is employed in a gang saw of the type shown in Figure 11, we have found it most convenient to form integral with coupling member 14, the two half flange members, as 28 and 30.

Each stub shaft 10 and 12 is formed with a bearing seat 32 which is adapted to receive anti-friction bearings as 34 and 36. There are several types of anti-friction bearings that are suitable for this use, consequently, their detailed structure has not been illustrated, however, all such bearings are constructed with a continuous inner-sleeve race and an outer-sleeve race, in between which are disposed the load-carrying rollers or balls.

It follows in such an arrangement that on the ends of each of shafts 10 and 12, exterior of the bearings 34 and 36 is preferably an increased diameter portion which forms the seat for crank members 38 and 40. These cranks, which are arranged to carry the crank pins 42 and 43, are counter-balanced by a large mass of metal as illustrated in Figure 4 at 45. The weight of this counter-balancing metal must be sufficient to counteract the static unbalancing efforts of the connecting rods, as 48 and 50, illustrated in Figure 11. These rods, of necessity, must be long and heavy and this load, together with the inertia and dead weight load of the saw carriage 52, for instance, places tremendous torsional stress on this seat, and to insure secure positioning of the crank members on seat 54, it has been found most satisfactory to heat the crank members and shrink them onto seats 54. Torsional strains are further resisted by using a dowel member which serves as a key. This member fits one half normally in dowel seat 56 in the crank member, and one half in seat 54, as is shown at 57.

In order to distribute driving strains most satisfactorily, we prefer to have the driving belt pulley 60 secured, at substantially the center of the shaft, by bolting the same to flange members 28 and 30, by a plurality of bolts 62.

In Figures 8, 9, and 10, we have illustrated a slightly modified form of structure that is more adaptable for machining in those plants which are not especially equipped to manufacture this heavy type of equipment. One variation consists of having the driving pulley made of two parts, as 70 and 72, which are bolted together along a diameter, which diameter is normal to the plane of Figure 8. A plurality of bolts 74 is so employed and these bolts seat in partial grooves 76 cut in the two abutting stub shafts 80 and 82. Coaxial alignment of these two stub shafts is provided by counter-boring stub 80 at 84 and providing a detent 85 formed as part of stub shaft 82. These members are similarly tapered so that a very secure centering is provided. The two stub shafts are held firmly in abutting relationship by the through rod 88, which passes axially through both members and is provided with a nut on at least one end, as 89. The nut and bolt heads are normally disposed within counter-bores 90. The driving torque is transmitted to the built-up shaft formed of members 80 and 82, from the driving pulley 60, by means of a key and co-acting keyway shown at 92. Normally this is arranged with half the length of the key in each of the two stub shaft members, so as to equalize or distribute the driving strain.

Bearing seats are provided at 94 and 95, for the preferably self aligning bearings 96 and 97. The driving cranks 38 and 40 have enlarged seats, as at 98 and 99. The crank members are normally shrunk on to the seats and their angular position is assured by keying or doweling the same in place.

In Figure 11 we have illustrated one typical and suitable use for our built-up crank, in which it is employed with a gang saw. These are large pieces of equipment which are arranged to saw an entire log at one time with a plurality of parallel spaced saws so as to produce a large number of boards from the log L shown in dashed lines.

In such installations, the floor line is normally at about the point shown by the dashed line F, and the control wheel W is at a convenient height for manual operation, consequently, the size of this equipment can be visualized. Bearings 34 and 36 are supported from the main frame 65 as by the bearing housings 67 and 68.

It is believed that it will be clearly apparent from the above description and the disclosure in the drawings that the invention comprehends a novel construction of a built-up crank shaft for reciprocating machinery.

Having thus disclosed the invention, we claim:

1. A built-up crank for reciprocating gang saw machinery, comprising: two axially aligned stub shafts disposed in end abutting relationship; one of said shafts having an axial, cylindrical detent and the other having an axial, cylindrical opening in which said detent is positioned; an elongated key having a rectangular outline in transverse cross-section; said shafts having connecting longitudinal keyways in their adjacent portions, and said elongated key being positioned in said keyways; a coupling member split longitudinally into two halves, said coupling member being cylindrically bored and accommodating said shafts and one of said halves having a longitudinal recess accommodating and securing the outer portion of said elongated key; two groups of bolts and nuts, said halves being secured together by said groups of bolts and nuts, said groups being parallel and disposed on opposite sides of said shafts and each group having a plurality of bolts alongside each stub shaft, said shafts having transverse grooves in which the adjacent portions of said bolts are positioned; said coupling having on its central portion and integral therewith a single annular transversely extending flange which is split at the plane of abutment of said two halves of said coupling; a pulley having a single inwardly extending annular flange forming an opening large enough to pass said coupling and with one side of its inner portion abutting one side of the outer portion of said transversely extending flange; bolt and nut means extending through said flanges and securing the same together; and each shaft having two cylindrical enlarged portions on its outer end portion, the outer enlarged portion being larger than the inner enlarged portion, the outer portion being adapted for the mounting of crank means and the inner portion providing a seat for bearing means.

2. A built-up crank shaft for reciprocating gang saw machinery, comprising: two axially aligned stub shafts disposed in end abutting relationship; one of said shafts having an axial detent and the other having an axial opening in which said detent is positioned; an elongated key; said shafts having connecting longitudinal keyways in their adjacent portions, and said elongated key being positioned in said keyways; a coupling member split longitudinally into two halves, said coupling member being cylindrically bored and accommodating said shafts and one of said halves having a longitudinal recess accommodating and securing the outer portion of said elongated key; two groups of bolts and nuts, said halves being secured together by said two groups of bolts and nuts, said groups being parallel and disposed on opposite sides of said shafts, said shafts having transverse grooves in which the adjacent portions of said bolts are positioned; said coupling member having on its central portion and integral therewith a single annular transversely extending flange which is split at the plane of abutment of said two halves of said coupling; a pulley having a single inwardly extending annular flange; means for removably connecting said flanges together in side abutting relationship; and each shaft having two cylindrical enlarged portions on its outer end portion, the outer enlarged portion being larger than the inner enlarged portion, the outer portion being adapted for the mounting of crank means and the inner portion providing a seat for bearing means.

CARL SAMUEL SUNDBOM.
CARL VICTOR WINQUIST.

References Cited in the file of this patent

UNITED STATES PATENTS

| Number | Name | Date |
|---|---|---|
| 170,917 | Thomas | Dec. 7, 1875 |
| 334,547 | Richards | Jan. 19, 1886 |
| 393,211 | Chase et al. | Nov. 20, 1888 |
| 750,910 | Townsend | Feb. 2, 1904 |
| 1,448,506 | Prellwitz | Mar. 13, 1923 |
| 1,464,750 | Davis | Aug. 14, 1923 |
| 1,918,784 | Rode | July 18, 1933 |
| 2,434,659 | Kuppel | Jan. 20, 1948 |

FOREIGN PATENTS

| Number | Country | Date |
|---|---|---|
| 16,590 | Great Britain | July 27, 1896 |
| 48,670 | Norway | Nov. 17, 1930 |